United States Patent
Vau et al.

(10) Patent No.: US 11,036,193 B2
(45) Date of Patent: Jun. 15, 2021

(54) METHOD FOR COMPENSATING FOR CORIOLIS, CENTRIFUGAL AND GRAVITATIONAL COUPLES IN A MOVEMENT SIMULATOR AND SYSTEM COMPRISING A MOVEMENT SIMULATOR

(71) Applicant: IXBLUE, Saint-Germain-en-Laye (FR)

(72) Inventors: Bernard Vau, Saint Maur des Fosses (FR); Mehdi Bussutil, Ormesson sur Marne (FR)

(73) Assignee: IXBLUE, Saint-Germain-en-Laye (FR)

( * ) Notice: Subject to any disclaimer, the term of this patent is extended or adjusted under 35 U.S.C. 154(b) by 365 days.

(21) Appl. No.: 16/311,967

(22) PCT Filed: Jun. 16, 2017

(86) PCT No.: PCT/FR2017/051582
§ 371 (c)(1),
(2) Date: Dec. 20, 2018

(87) PCT Pub. No.: WO2017/220900
PCT Pub. Date: Dec. 28, 2017

(65) Prior Publication Data
US 2020/0183341 A1    Jun. 11, 2020

(30) Foreign Application Priority Data

Jun. 20, 2016  (FR) ...................................... 1655741

(51) Int. Cl.
*G05B 13/04*    (2006.01)
*G05B 19/404*    (2006.01)

(52) U.S. Cl.
CPC ........... *G05B 13/04* (2013.01); *G05B 19/404* (2013.01); *G05B 2219/39187* (2013.01)

(58) Field of Classification Search
CPC .................. G05B 14/04; G05B 19/404; G05B 2219/39187
See application file for complete search history.

(56) References Cited

U.S. PATENT DOCUMENTS

| 3,015,457 A | * | 1/1962 | Dixson | ................ G05D 1/0202 244/3.16 |
| 5,021,982 A | * | 6/1991 | Crosbie | .................... G09B 9/12 434/55 |

(Continued)

FOREIGN PATENT DOCUMENTS

| EP | 1 630 070 | 3/2006 |
| EP | 1 847 892 | 10/2007 |

(Continued)

OTHER PUBLICATIONS

International Search Report, PCT/FR2017/051582, dated Sep. 25, 2017.

(Continued)

*Primary Examiner* — Ronald D Hartman, Jr.
(74) *Attorney, Agent, or Firm* — Nixon & Vanderhye

(57) ABSTRACT

Disclosed is a method for compensating for disturbing couples for a movement simulator, the simulator including, for each axis, a monovariable correcting unit that receives a signal giving the difference between the setpoint $\theta^r_j$ and the measurement $\theta_j$ for the corresponding axis and producing the control signal $U_j$. The disruptive couples are Coriolis, centrifugal and gravitational couples and furthermore a compensating law calculates a formula (a) estimating the disruptive couples, calculated on the basis of an error $\varepsilon_j(t)$ that is the control signal $U_j$ filtered by a filter $H(q^{-1})$, and the simulator is modelled with a dynamic model expressing the couples in an affine way with respect to a set of base parameters $\chi$ according to a matrix relationship of the type: formula (b), and a subset j of base parameters, the estimation (Continued)

Figure 3:
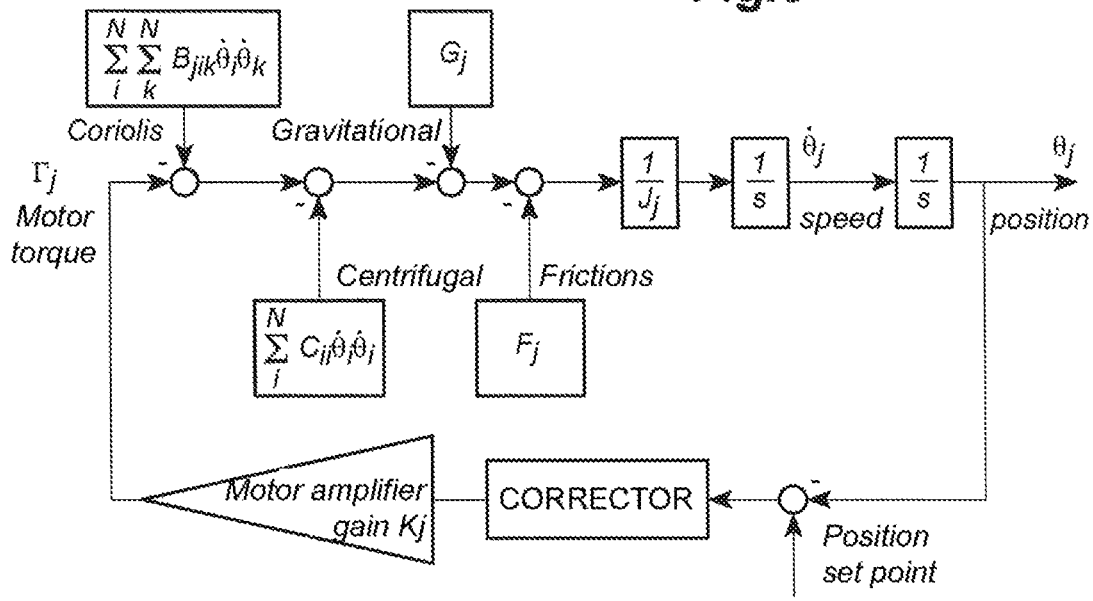

of the couples being formula (c), and, online, the $\alpha_j$ are calculated via an iterative equation.

20 Claims, 4 Drawing Sheets

(56) References Cited

U.S. PATENT DOCUMENTS

| | | | |
|---|---|---|---|
| 6,515,442 | B1 | 2/2003 | Okubo et al. |
| 7,574,294 | B2 | 8/2009 | Ta et al. |
| 8,386,058 | B2 | 2/2013 | Vau |
| 8,803,466 | B2 | 8/2014 | Yoshiura et al. |
| 10,556,336 | B1* | 2/2020 | Bai ........................ B25J 9/1671 |
| 2004/0143369 | A1* | 7/2004 | Takenaka ............. B62D 57/032 700/245 |
| 2007/0007072 | A1 | 1/2007 | Ta et al. |
| 2007/0073442 | A1* | 3/2007 | Aghili ................... B25J 9/1605 700/245 |
| 2009/0047636 | A1* | 2/2009 | Van Biervliet .......... G09B 9/12 434/55 |
| 2009/0281670 | A1 | 11/2009 | Vau |
| 2013/0057191 | A1 | 3/2013 | Yoshiura et al. |
| 2013/0157227 | A1* | 6/2013 | Jansen ..................... G09B 9/14 434/30 |
| 2016/0140862 | A1* | 5/2016 | Van Lookeren Campagne ........... G09B 9/14 434/55 |
| 2017/0108612 | A1* | 4/2017 | Aguib ..................... G01V 7/06 |
| 2018/0018896 | A1* | 1/2018 | Seehof ............. G05B 19/41885 |
| 2018/0043245 | A1* | 2/2018 | Zhu ......................... G06T 19/20 |
| 2020/0086482 | A1* | 3/2020 | Johnson ................. B25J 9/0009 |
| 2020/0320897 | A1* | 10/2020 | Veltena .................... G09B 9/04 |
| 2020/0406461 | A1* | 12/2020 | Bacher ................... B25J 9/1671 |

FOREIGN PATENT DOCUMENTS

| | | |
|---|---|---|
| EP | 2 116 912 | 11/2009 |
| EP | 2 571 159 | 3/2013 |

OTHER PUBLICATIONS

Horowitz et al., "Model Referenced Adaptive Control of a Two Axis Direct Drive Manipulator Arm"., Dept of Mechanical Engineering, University of California Berkeley, CH2413-3/87/0000/ 1987, IEEE.
Craig et al., "Adaptive Control of Mechanical Manipulators", Design Divison, Dept. of Mechanical Engineering, Dept. of Electrical Engineering and Electronics Research Laboratory., 1986 IEEE.
Slotine et al., "Adaptive Control"., Applied nonlinear control, Prentice hall, 1991.

* cited by examiner

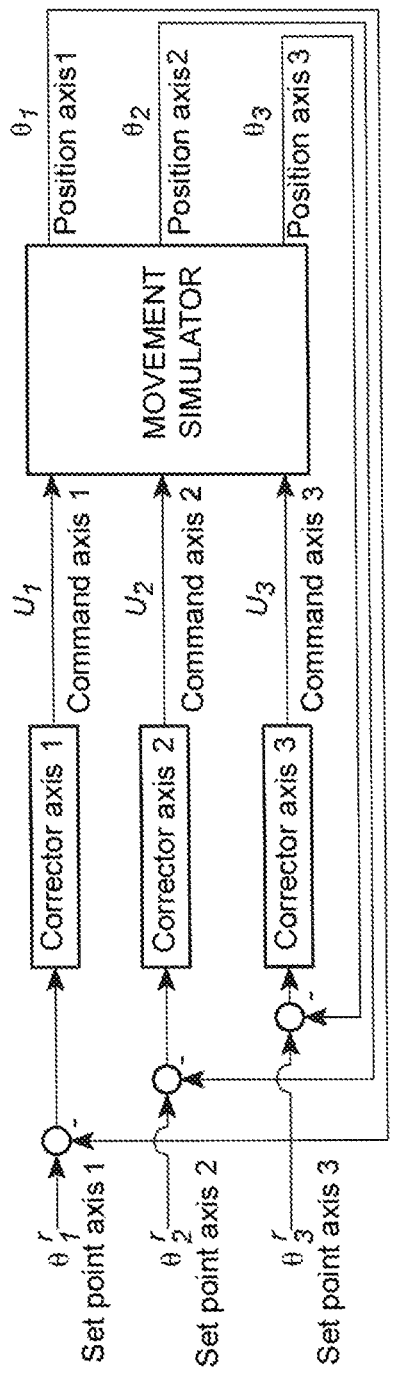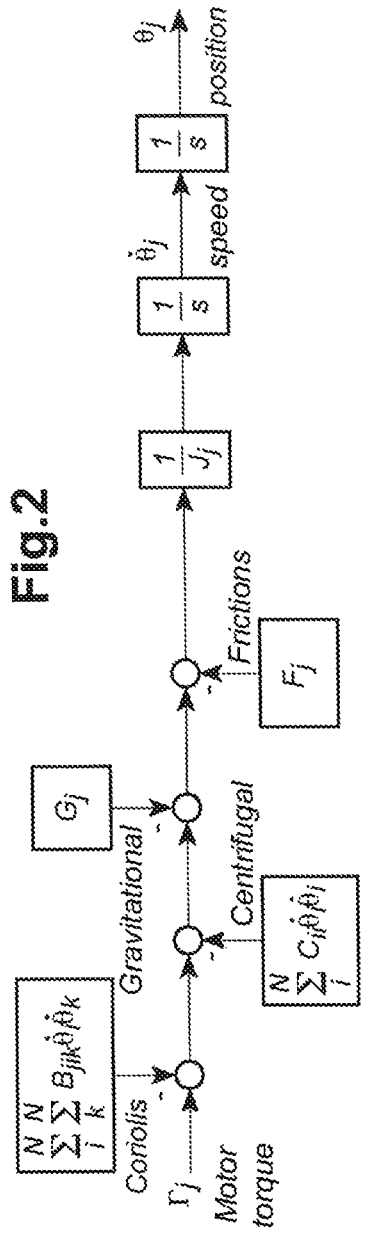

METHOD FOR COMPENSATING FOR CORIOLIS, CENTRIFUGAL AND GRAVITATIONAL COUPLES IN A MOVEMENT SIMULATOR AND SYSTEM COMPRISING A MOVEMENT SIMULATOR

TECHNICAL FIELD TO WHICH THE INVENTION RELATES

The present invention generally relates to the field of test systems, intended in particular for measuring devices liable to be subjected to movements and that are tested by being subjected to controlled movements. It more particularly relates to a method for compensating for Coriolis, centrifugal and gravitational torques in a movement simulator. The invention also relates to a system including a movement simulator adapted to perform this compensation.

STATE OF THE ART

The movement simulators are rotating machines intended to test devices including in particular inertial components, for example gyrometers, accelerometers and inertial units. As a function of the tests to be performed on these components, the user may use simulators consisted of 1, 2, 3 or even 4 joints imbricated into each other, in a mechanical structure similar to that of a universal joint. Each of the joints of the simulator has at least one effector, that is generally an electric motor whose torque is controlled. This electric motor may be a direct-current motor, an alternative-current motor, with or without brushes (brushless). The effector may sometimes be of the hydraulic type, the control being then performed through a fluid whose parameters are controlled (in particular, the pressure, the flow rate). The angular positions of the joints are measured by means of position sensors, which may be in particular incremental encoders. In some cases, angular speed sensors are also present on these machines, for example with a tachometer.

The angular positions and/or speeds are servo-controlled thanks to a corrector-based control law implemented in a programmable calculator, typically a micro-computer and/or a digital signal processing (DSP) computer device. Based on position/speed set points provided by the user via a trajectory generator, and based on angular position or speed measurements, the control law provides a command, in particular a torque command, that is applied to the amplifier of the motor of each of the joints. The movement simulators are test machines, and for this reason, their servo-controlled axes must follow position and speed set points with a great accuracy.

If the movement simulator has at least two joints, mechanical phenomena of interaction between the joints occur. These phenomena are called couplings. This means that the position/speed of a joint is not fully independent from the positions/speeds of the other joints that cause disturbing torques on said joint. In the automation specialist vocabulary, a movement simulator is an intrinsically multivariable system. These couplings are easily modellable, because they correspond to well-known physical phenomena. These couplings are non-linear and result from Coriolis, centrifugal and gravitational torques.

The conventional movement simulators incorporate control laws that are generally said "monovariable": this means that the torque command produced by the servo-control of a joint is established only based on the position or speed set point and the measured position or speed of said joint. In particular, the positions and speeds of the other joints are not explicitly taken into account in these conventional control laws. FIG. 1 of the state of the art, which will be described in detail hereinafter, and which shows a three-joint simulator with its control using correctors, schematizes this fact.

Hence, the conventional control laws of the simulators compensate only indirectly for the non-linear coupling phenomena: the couplings are perceived by the corrector as a disturbance on the torque of the joint and this disturbance is compensated for more or less well by the corrector, as a function of the frequency response thereof.

In some particular modes of operation of the movement simulator, in particular if the rotational speeds of several joints are simultaneously high, several hundredths of %/s (degrees per second), the coupling phenomena may seriously compromise the speed stability performances of each of the joints of the simulator. That, even if the monovariable control laws have optimum dynamic performances.

Taking into account the strong requirements in terms of performance and position and speed stability of the movement simulators, it is hence essential to develop control laws that make it possible to explicitly take into account all the joints and the couplings thereof.

For that purpose, the multivariable control laws are particularly indicated. Thanks to this type of control law, the torque command for a joint coming from the corrector depends not only from the position and/or speed of said joint, but also from the positions and/or speeds or the other joints. A multivariable control law, by definition, takes explicitly into account these coupling phenomena, in order to compensate at best for them and to significantly alleviate the damaging effects.

It is known from document EP 2 116 912 A1 a robust method of rejection of periodical disturbances, which implements a control structure using a Youla parameter associated with a central corrector. It is herein a structure of the "feedback" type, whereas the present invention implements a loop of the "feedforward" type, the compensation being operated based on reference signals that are external to the servo-control loop to which the compensation relates. One of the advantages of such a structure is to free from the stability constraints relating to a structure of the feedback type. Documents EP 1 630 070, EP 1 847 892 A2 and EP 2 571 159 A2 are also known.

TECHNOLOGICAL BACK-GROUND

In the robotics field, the question of compensating for Coriolis, centrifugal and gravitational torques has been tackled in a number of publications.

Mention may be made in particular of the so-called "calculated torque" method, the methods based on the passivity theory, or the methods based on the Lyapounov principles of stability analysis. However, these methods suppose that a full dynamic model of the robot is available, for example obtained by identification. In the cases where the parameters of said model are not known, it is necessary to use adaptive methods, making it possible to estimate these parameters in line/real time. The most conventional adaptive techniques are those that make use of adaptive concepts developed for the linear systems (for example, Horowitz et al.: "Model referenced adaptive control of a two axes direct drive manipulator arm", Proc. IEEE international conference on robotics and automation, Raleigh, 1987). Other methods use principles based on the formulation of a non-linear decoupling and a linearising adaptive control (J. Craig: "Adaptive control of mechanical manipulators", Proc. IEEE, International conference on robotics and automation, 1986). Mention may also be made of techniques based on the formulation of an adaptive control based on the passivity properties of the robots (Slotine and Li: "Applied non-linear control", Prentice Hall, 1991).

All these techniques are developed within the general framework of robotics, and they are hence based on the constraints met in robotics.

Now, in the field of movement simulators, the constraints and specificities are different, in particular the possibility that there is no minimum or maximum angular position constraints. This property allows in particular constant-speed axial movements to be maintained during a long time interval, and it is exploited in the present invention. Another characteristic of a movement simulator is that it has many symmetries and that, generally, the multiple axes of rotation are intersecting, which simplifies the model and allows, most of time, considering the inertia matrix of the dynamic model as being constant or almost-constant.

OBJECT OF THE INVENTION

In order to remedy the above-mentioned drawback of the state of the art, the present invention proposes a method for compensating for disturbing torques for a movement simulator, said simulator including joints controlled by effector members about axes j as a function of movement set points $\theta^r_j$ on the axes, each effector member of a specific given axis of the effector member receiving a command $U_j$ and a sensor for the axis measuring $\theta_j$, the action of the effector member about said axis j, the simulator being in a system including, for each axis, a control law with a monovariable corrector block in a feedback loop, said monovariable corrector block of transfer function $Corr(q^{-1})$ receiving as an input a signal of difference between the set point $\theta^r_j$ and the measurement 61, for the corresponding axis and producing as an output the command $U_1$.

According to the invention, the disturbing torques are Coriolis, centrifugal and gravitational torques and, for each axis, a control law is implemented, which includes, in addition to the monovariable corrector block per axis, a non-linear and multivariable compensation law combined to the monovariable corrector blocks, the compensation law calculating, as a function of the command $U_k$, an estimation $\hat{P}_j(t)$ of the disturbing torques, said estimation $\hat{P}_j(t)$ being injected into the command $U_j$ sent to the effector member, to compensate for the disturbing torques, and the estimation $\hat{P}_j(t)$ of the disturbing torques being calculated based on the value of an error signal $\varepsilon_j(t)$, which is a version of the command $U_j$ filtered by a transmittance filter $H(q^{-1})$ intended to eliminate at least the direct component from the command, and the movement simulator is previously modelled in order to obtain a dynamic model affinely expressing the torques with respect to a set of base parameters $\chi$ according to a matrix relation of the type: $\phi_j^T(\theta, \dot{\theta}, \ddot{\theta})\chi_j$, the index j corresponding to the different axes, a sub-set $\alpha_j$ of the base parameters corresponding to disturbing torques having a level higher than a determined disturbance threshold is determined, following to the previous modelling of the simulator, the estimation $\hat{P}_j(t)$ of the disturbing torques being calculated by: $\hat{P}_j(t) = \phi_j^T(\theta, \dot{\theta})\hat{\alpha}_j$, and the estimations of the sub-set of base parameters are calculated in line by an iterative equation:

$$\hat{\alpha}_j(t+1) = \hat{\alpha}_j(t) + \mu_j \phi_{Fj}^T(t)\varepsilon_j(t)$$

with $\phi_{Fj}(t) = H(q^{-1})T(q^{-1})\phi_1(t)$ the vector elements $\phi_j^T(t)$ being filtered by $H_j Corr_j G_j/(1+C_j H_j)$ to obtain the vector $\phi_{Fj}^T(t)$, T being defined by the relation $(1+Corr(q^{-1})L(q^{-1}))\cdot T(q^{-1}) = Corr(q^{-1})L(q^{-1})$, with $L_j(q^{-1})$ the discrete transmittance of the transform of the product $$\frac{1}{J_j}\frac{1}{S}$$

in the case of a sampled system where $J_j$ are the inertias and $\mu_j$ is a defined positive real square matrix serving as an adjustment parameter for the speed of convergence of the estimation.

Other non-limitative and advantageous characteristics of the method according to the invention, taken individually or according to all the technically possible combinations, are the followings:

- during the calculation of the estimation $\hat{P}_j(t)$ of the disturbing torques, the effects of the variation of the inertia matrix are neglected,
- the transmittance filter $H(q^{-1})$ intended to eliminate the direct component from the command is a high-pass filter,
- the transmittance filter $H(q^{-1})$ intended to eliminate the direct component from the command is a band-pass filter,
- a real-time adaptive compensation is implemented, in which the estimations of the sub-set of base parameters are previously calculated and stored in tables, and wherein:
  in a preliminary phase:
    for each non-linear effect of each axis, a sensitizing movement is chosen on one or several other constant-speed axes, leading to a significant disturbance in the torque of said axis,
    estimations of the sub-set of base parameters are calculated by the iterative equation $\hat{\alpha}_j(t+1) = \hat{\alpha}_j(t) + \mu_j \phi_{Fj}^T(t)\varepsilon_j(t)$ until there is convergence,
  in a real-time implementation phase, the base parameter tables are directly used to calculate the estimation $\hat{P}_j(t)$ of the disturbing torques by: $\hat{P}_j(t) = \phi_j^T(\theta, \dot{\theta})\hat{\alpha}_j$,
- the convergence corresponds to the fact that the value of the error signal $\varepsilon_j(t)$ tends to zero,
- a recursive gradient algorithm is implemented,
- the movement simulator is used at constant speed or low speed-variation rate in the phase of estimation of the estimates $\hat{\alpha}_j(t)$,
- a movement simulator is implemented, which has at least two controlled axes and which includes for each axis a control law with a monovariable corrector block in a feedback loop, said corrector receiving as an input a signal of difference between the setpoint $\theta^r_j$ and the measurement $\theta_j$ for the corresponding axis and producing as an output the command $U_j$ intended to an effector member, and, between the output of the corrector block and the effector member, a hardware module is added, for calculating the compensation law and compensating the command, said module being either a computer program loaded on a support and intended to complete an computer program of the monovariable corrector block, or an electronic and programmable device for capturing the command at the exit of the corrector block and sending to the motor a command compensated by the compensation law, a joint model is used, in which the inertias of the different joints are independent relative to each other, the inertia tensors of the joints of the movement simulator being a diagonal matrix.

The invention also relates to a system with a movement simulator including a movement simulator and means for compensating for disturbing torques, said simulator including joints controlled by effector members about axes j as a function of movement set points $\theta^r_j$ on the axes, each effector member of a specific given axis of the effector member receiving a command $U_j$ and a sensor for the axis measuring $\theta_j$, the action of the effector member about said axis j, the system including, for each axis, a control law with a monovariable corrector block in a feedback loop, said corrector block receiving as an input a signal of difference between the set point $\theta^r_j$ and the measurement $\theta_j$ for the corresponding axis and producing as an output the command $U_j$, and wherein the means for compensating for the disturbing torques are a programmable calculator specifically configured to execute the method according to the invention.

DETAILED DESCRIPTION OF AN EXEMPLARY EMBODIMENT

The following description, in relation with the appended drawings given by way of non-limitative examples, will allow to understand in what consists the invention and how it may be made.

Figure 4:
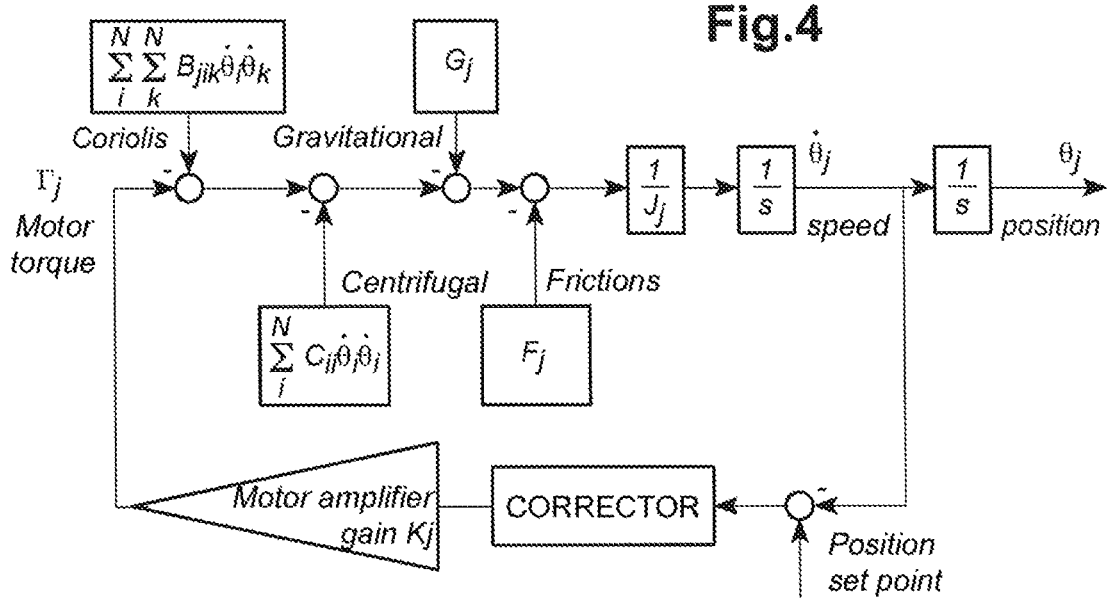
Figure 5:
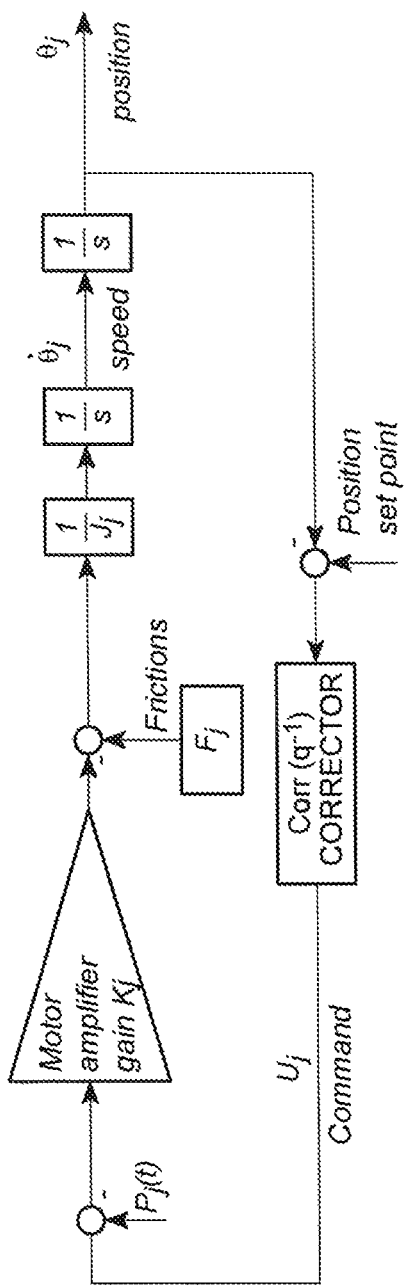
Figure 6:
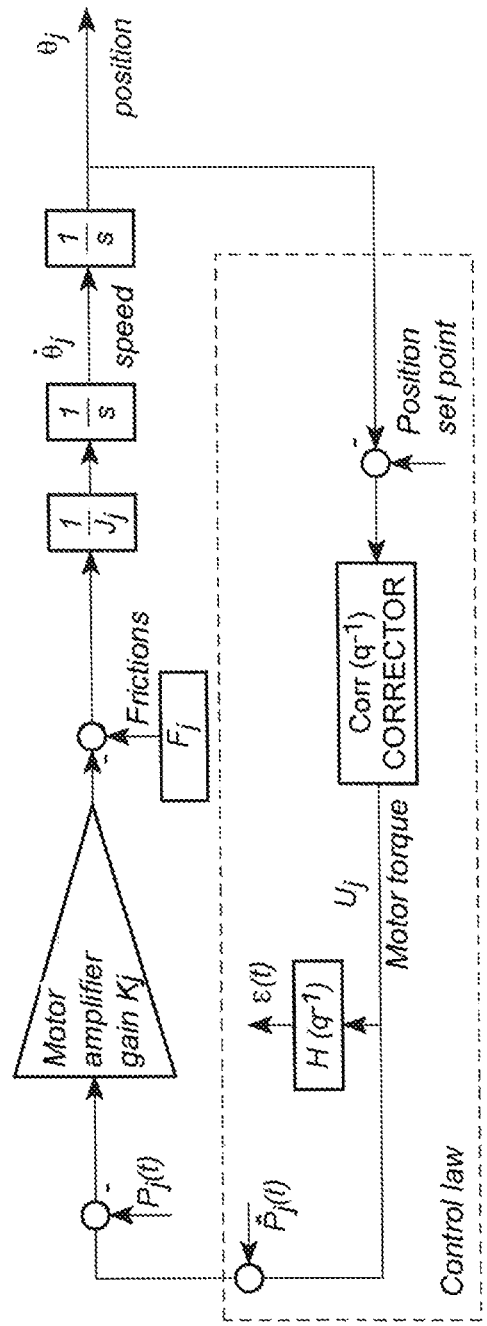
Figure 7:
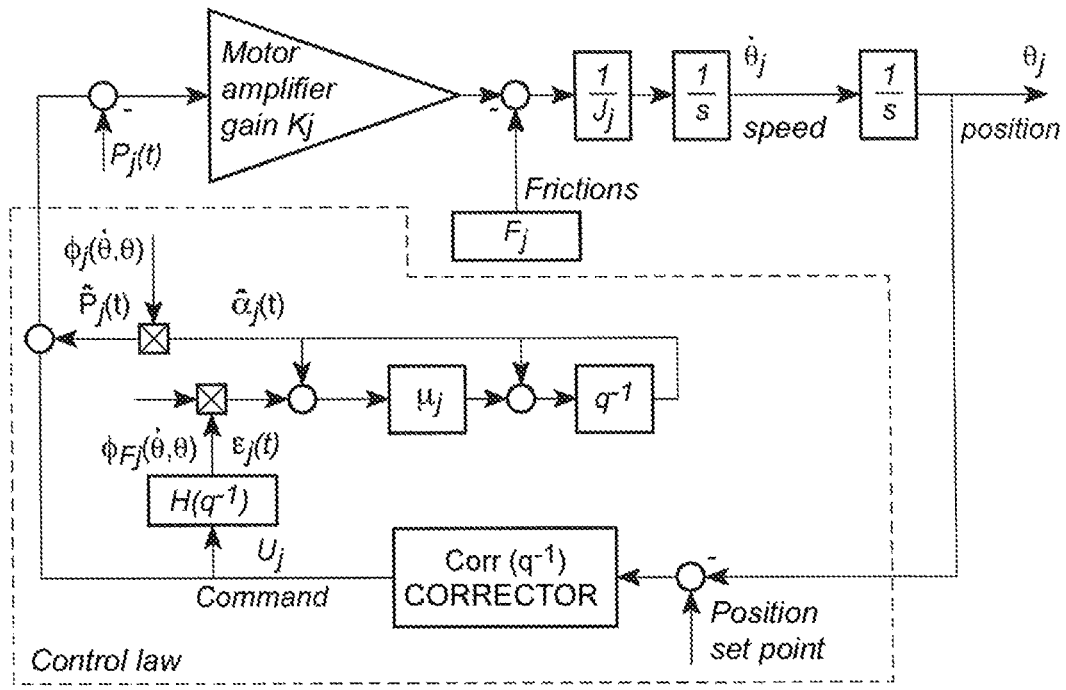
Figure 8:
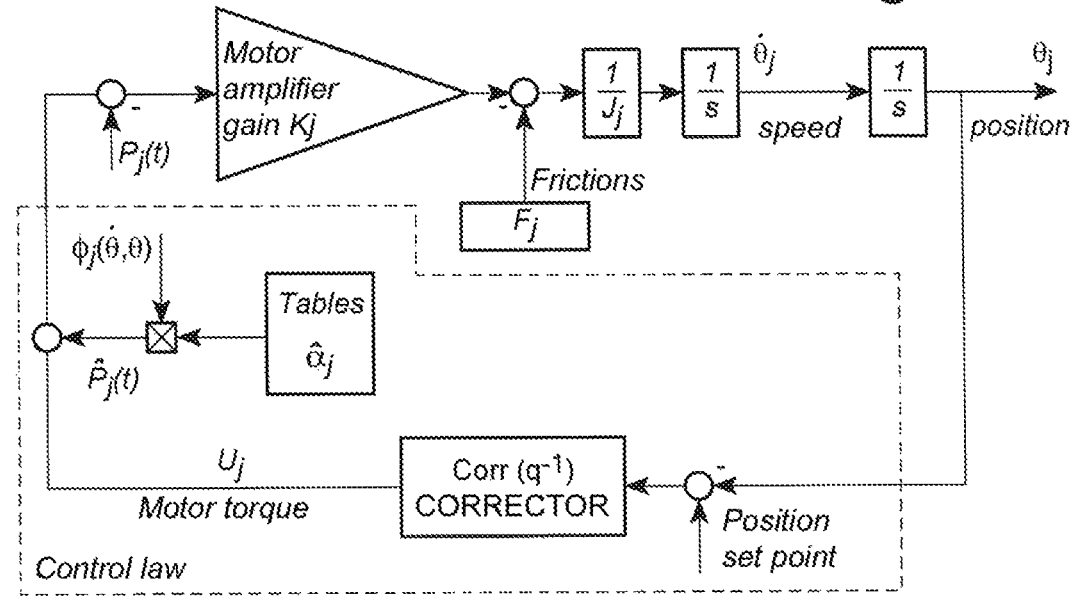

In the appended drawings:

FIG. 1 shows a controlled movement simulator of the state of the art, wherein each control axis has its own monovariable control law with corrector and feedback loop, FIG. 2 shows a simplified block diagram of the dynamic model of a joint, taking into account, in addition to the frictions, the effects of the Coriolis, centrifugal and gravitational torques (the latter being sometimes called "unbalance mass"), FIG. 3 shows a simplified block diagram of an application of the dynamic model of FIG. 2 to a monovariable control law with corrector and feedback loop, in the case of a position servo-control, FIG. 4 shows a simplified block diagram of the type of the application of FIG. 3, but this time in the case of a speed servo-control, wherein the final integration of the speed to obtain the position can then be omitted, FIG. 5 shows a simplified block diagram of the type of the application of FIG. 3, but with a reorganization of the blocks to isolate the effects of the Coriolis, centrifugal and gravitational torques, FIG. 6 shows a simplified block diagram based on that of FIG. 5, with introduction of a law for compensating for the effects of the Coriolis, centrifugal and gravitational torques by injecting into the loop of an estimation of these latter based on an error signal obtained from the motor torque signal produced by the corrector, and FIGS. 7 and 8 show two simplified block diagrams based on that of FIG. 6, in two modes of application of the invention, a second, adaptive mode (FIG. 7), for constant speeds with in-line/real time calculations of a vector sub-set of relevant base parameters, and a first, non-adaptive mode (FIG. 8), with the use of the vectorial sub-set of relevant base parameters calculated in the second mode and then memorized.

The state of the art will now be described in relation with FIG. 1, in order to facilitate the later presentation of the invention based on known elements. In FIG. 1, a control simulator including three joints, which will be hereinafter likened to axes, is controlled as a function of individual set points on each of the axes.

One axis corresponds to one effector/motor and one sensor and, in the case where one joint of the simulator corresponds to one effector/motor and one sensor, the joint may be likened to an axis. In the case where the joint is complex, for example with several effectors and/or several sensors, it can be likened to a set of axes that will be processed as described. It is the same in the case of a joint with one effector/motor and several sensors or several motors and only one sensor.

One monovariable corrector block is implemented on each axis with a loop of feedback and measurement of the angular position about the corresponding axis. In this description, the term "corrector" covers a monovariable corrector block as conventionally used, i.e. without taking into account of the interactions between the axes, without compensation for the Coriolis, centrifugal and gravitational torques.

In FIG. 1, the variables: $\theta_1$, $\theta_2$, $\theta_3$ corresponding to the angular positions of the axes, $\theta_1^r$, $\theta_2^r$, $\theta_3^r$ are the set points of the angular positions of said axes and $U_1$, $U_2$, $U_3$ are the commands coming from the monovariable correctors and driving the power amplifiers of the simulator motors. One corrector is implemented per controlled axis.

The correctors may have, as in the figure, one degree of freedom, and be, for example of the PID type, or also two degrees of freedom, for example RST, LQG, predictive control, H-infinity . . . . These correctors are essentially linear. The set points $\theta_1^r$, $\theta_2^r$, $\theta_3^r$ are provided by a set point generator, itself acting as a function the orders given by the user of the movement simulator.

Moreover, a movement simulator itself is modellable by means of the traditional tools of robotics. In particular, to determine the dynamic model of the movement simulator, the Euler-Lagrange equations may in particular be used:

$$\frac{d}{dt}\left(\frac{\partial L(\theta, \dot{\theta})}{\partial \dot{\theta}}\right) - \frac{\partial L(\theta, \dot{\theta})}{\partial \theta} = \Gamma \qquad (1)$$

with:
$\theta$: the angular position vector of each axis,
$\dot{\theta}$: the angular speed vector of each axis,
$\Gamma$: the vector of the torques produced by the motors of each axis, and
where $L(\theta, \dot{\theta})$ is the Lagrangian of the system that is, by definition:

$$L(\theta,\dot{\theta})=E_c(\theta,\dot{\theta})-E_p(\theta) \qquad (2)$$

where:
$E_c(\theta, \dot{\theta})$ is the total kinetic energy of the simulator,
$E_p(\theta)$ the potential energy thereof.

The fundamental equation of the dynamics of the robotic systems then writs as:

$$A(\theta)\ddot{\theta}+M(\theta,\dot{\theta})d+G(\theta)+F(\dot{\theta})=\Gamma \qquad (3)$$

with:
$\ddot{\theta}$: the angular acceleration vector of each axis,
$A(\theta)$: a square matrix that is called "inertia matrix",
$M(\theta, \dot{\theta})$: the square matrix of the centrifugal and Coriolis torques,
$G(\theta)$: the gravitational torque vector,
$F(\dot{\theta})$: the friction torque vector.

A(θ), MI(θ, θ̇), G(θ) depend on the geometry of the movement simulator and in particular on the inertia tensors of each of the joints, on the positions of the mass centres with respect to the axes of rotation, etc. The dynamic model of the robot may be obtained using various conventions used in robotics, in particular the Denavit-Hartenberg convention or, also the modified Denavit-Hartenberg convention (described in the article: "A new geometric notation for open and closed-loop robots", in IEEE international conference on robotics and automation, San Francisco, April 1986).

In particular, using the modified Denavit-Hartenberg convention, it is shown that a dynamic model is obtained, which is linear with respect to a set of parameters χ, called base parameters, according to a matrix relation of the type:

$$\Gamma = \Phi^T(\theta, \dot\theta, \ddot\theta)\chi \quad (4)$$

In the matrix Φ, the terms depending on θ̈ are necessarily related to the coefficients of the inertia matrix.

Hence, the torque $\Gamma_j$ of the joint j for $1 \leq j \leq N$, where N is the number of joints, may be written as:

$$\Gamma_j = A_{1j}\ddot\theta_1 + A_{2j}\ddot\theta_2 + A_{3j}\ddot\theta_3 + \Sigma_i^N \Sigma_k^N B_{jik}\dot\theta_i\dot\theta_k + \Sigma_i^N C_{ji}\dot\theta_i^2 + G_j + F_j \quad (5)$$

where the $A_{1j}$, $B_{jik}$, $C_{ji}$, $G_j$ depend on the angular positions of the axes (i.e. the vector θ) and on the base parameters (i.e. on χ). Whereas $F_j$ depends on the angular speeds of the axes (i.e. the vector θ̇).

The friction torque $F_j$ can be decomposed into a dry friction torque that is considered, in a first approximation, as being proportional to the sign of $\dot\theta_j$, and a viscous friction torque that is considered, in a first approximation, as being proportional to $\dot\theta_j$. Under these first approximation conditions, it is observed that, at constant speed of a joint, and hence without acceleration, the friction torque is constant and can hence be eliminated by high-pass filtering or at the very least by elimination of the direct components.

Within the framework of the procedure of adjustment of the law for compensating for the Coriolis, centrifugal and gravitational torques, the following approximations are made:

1) the inertia matrix of the movement simulator has terms independent from the vector θ, which is the angular position vector,
2) the inertia matrix of the movement simulator is diagonal.

The first approximation is quite well justified in general, taking into account the geometry of the movement simulators. The second is justified by the fact that the tests performed within the framework of the adjustment of the compensation law are made at constant speed and hence null acceleration, as will be seen hereinafter during the implementation of the multivariable control law of the invention.

These two approximations amount to say that, for the inertia matrix:

$$A \approx \begin{bmatrix} J_1 & 0 & 0 \\ 0 & J_2 & 0 \\ 0 & 0 & J_3 \end{bmatrix} \quad (6)$$

Under these conditions of approximation, it is possible to determine, for each joint of the simulator, a block diagram describing the dynamic model of the system, which is schematized in FIG. 2.

Within the framework of the application of a conventional control law, i.e. a monovariable law, a simplified linearized dynamic model (that is to say, that does not take into account the Coriolis, centrifugal, gravitational effects and the dry frictions) of the system developed hereinabove may be used. The obtained corrector-based conventional monovariable control law is schematized for, respectively, a position and speed servo-control, in FIGS. 3 and 4.

The role of the corrector is to ensure the follow-up of position and speed set points and hence to compensate for the disturbing torques. According to the dynamics of this corrector, the disturbing torques are more or less well compensated for. In particular, the more the corrector dynamics is high, the better the disturbance rejection is made, and the less the disturbance effect occurs on the servo-controlled variable, whether it is the speed or the position.

However, in many cases, even if the corrector is optimally adjusted so as to have a significant dynamic, these disturbances are too imperfectly compensated for, due to the fact that monovariable correctors are implemented and hence that the interactions/couplings between joints/axes are not taken into account as a whole.

This is hence for that purpose that, with the present invention, a means is proposed, which performs a more efficient compensation for the non-linear disturbances, in particular the Coriolis, centrifugal and gravitational torques, than those which the only conventional monovariable correctors seen hereinabove can perform, and so as to minimize the impact of said disturbances on the servo-controlled values.

The compensation law proposed, which is non-linear and multivariable, will now be described, as well as the adjustment method thereof.

First of all, the inertias $J_j$ as well as the amplifier gains $K_{aj}$, and the torque constants $K_{mj}$ of the motors, are supposed to be known. In other words, the ratio $$\frac{K_{aj}K_{mj}}{J_j}$$

is directly or indirectly known.

The term "amplifier gains" must be understood herein within the broad meaning and as possibly including gains of potential digital-analogic converters, analogic-digital converters and of reducers or other elements of the loop.

Let's $K_j$ be the whole gain between the command coming from the control law and the torque produced by the motor(s) of the axis j.

Likewise, the transfer functions $Corr_j(q^{-1})$ of each monovariable corrector are supposed to be known.

For that purpose, the linearized dynamic model of the system formed by the simulator will have been identified, and the monovariable control law, i.e. the corrector, will have been adjusted, as shown hereinabove, in order to collect these data. The constants of the motor torque are data from the motor manufacturers. The amplifier gains are measurable or calculable data, according to the case. The inertias are obtained by identification and, on this matter, reference may be made to the work of L.Ljung "System identification, Theory for the user", Prentice Hall.

In a variant of implementation, estimations or hypotheses may be made about the model, and in particular about the inertias, or even be calculated based on an analysis of a modelled computer representation of the simulator.

The multivariable compensation and monovariable corrector control law proposed may be declined into two modes of application of the compensation law:
- a first embodiment for non-adaptive compensation for the disturbing torques using previous determined parameters, and
- a second mode for in-line/real time estimation and compensation of the parameters necessary to the application of the first mode.

The second mode of in-line estimation, which may be qualified as adaptive, is used in a phase of adjustment of the compensation law for determining the parameters that are useful for the first mode. In a phase of functional application to tests, the first mode of compensation for the disturbing torques is preferably used, using the parameters previously determined with the second mode.

We will first describe the second mode of estimation of the parameters useful for the compensation law.

In the adjustment phase, the adaptive law is based on the fact if an axis j rotates at a constant speed and if the dry friction torque is considered as being constant over 360°, and in the hypothesis that there is no Coriolis, centrifugal or gravitational torque, which are then null, then the output of the corrector $U_j(t)$ is constant. Conversely, still at constant speed, but in the hypothesis that Coriolis, centrifugal and gravitational torques are present, then the command $U_j(t)$ is no longer constant due to the feedback caused by the presence of the loop. As will be seen, a filtering makes it possible to separate the non-constant elements from those which are constant.

We will now use a representation of the looped system that makes it possible to isolate the effects of the Coriolis, centrifugal and gravitational torques with respect to the other effects mentioned hereinabove.

Let's $P_j(t)$ be equal to the sum of the Coriolis, centrifugal and gravitational torques acting on the axis j, the whole multiplied by the inverse of the amplifier gain $K_{aj}$ and by the inverse of the torque constant of the motor $K_{mj}$, i.e.:

$$P_j(t) = \frac{1}{K_j}\left(\sum_i^N \sum_k^N B_{jik}\dot{\theta}_i\dot{\theta}_k + \sum_i^N C_{ji}\dot{\theta}_i^2 + G_j(\theta_j)\right) \quad (7)$$

With these conventions, a simplified scheme of the control loop peculiar to a joint may be modelled according to the scheme of FIG. 5 in the case of a position servo-control.

To obtain a compensation for the effects of the Coriolis, centrifugal and gravitational torques, it is hence just necessary to inject a compensation $P_j(t)$, which is an estimation of $P_j(t)$, into the output of the corrector, according to the scheme of FIG. 6.

The adaptive compensation law of the second mode is used when the speed set point is constant. This law consists in minimizing the square or, in a variant, the sum of the squares, of an error signal $\varepsilon_j(t)$, corresponding to the command $U_j(t)$ passed through a high-pass filter intended to eliminate the direct component of $U_j(t)$ and whose discrete transmittance is noted $H(q^{-1})$, where $q^{-1}$ is the delay operator in this sampled system.

Let's $L_j(z)$ be the z-transform of the system $$\frac{1}{J_j s}$$

provided with a sample and hold circuit, and $L_j(q^{-1})$ the associated discrete transmittance.

Taking into account the representation of FIG. 6, we have:

$$\varepsilon_j(t) = H(q^{-1})\frac{Corr_j(q^{-1})L_j(q^{-1})}{1 + Corr_j(q^{-1})L_j(q^{-1})} \cdot (P_j(t) - \hat{P}_j(t)) \quad (8)$$

But, taking into account the relation (4) that affinely expresses the disturbing torques with respect to the base parameters, the relations (9), (10), (11) can be deduced, in which the components of the vectors $\alpha_j$ form a sub-set of $\chi$ as defined by the relation (4). It other words, only the components of $\alpha_j$ that are the elements of $\chi$ that have an impact of the Coriolis, centrifugal and gravitational torques of axis j will be kept:

$$P_1(t) = \phi_1^T(\theta,\dot{\theta})\alpha_1 \quad (9)$$

$$P_2(t) = \phi_2^T(\theta,\dot{\theta})\alpha_2 \quad (10)$$

$$P_3(t) = \phi_3^T(\theta,\dot{\theta})\alpha_3 \quad (11)$$

There hence exists a generic relation of the type of equation (12):

$$P_j(t) = \phi_j^T(\theta,\dot{\theta})\alpha_j \quad (12)$$

This sub-set hence includes the components of the most significant $\alpha_j$, i.e. the base parameters for which the associated disturbing torques are the highest, in practice higher than a threshold that will have been determined. It hence understood that, as a function of the threshold and hence of the significance level chosen, the compensation will be more or less accurate. For example, based on a theoretical modelling, we will first determine the base parameters that produce the highest disturbing torque.

The dependence of $\phi_j$ on $\ddot{\theta}$ is omitted, taking into account the fact that the adaptive law is intended to operate at constant or almost-constant speeds, corresponding to null or almost-null accelerations.

Indeed, the movement simulator is herein used at constant speed of movement and, if there is a variation of speed, the latter must be the lowest possible, for example lower that 1%.

Let's $\hat{\alpha}_1(t)$ be the estimate of $\alpha_j$. The estimate of $P_j(t)$, noted $\hat{P}_j(t)$, is written:

$$\hat{P}_j(t) = \phi_j^T(\theta,\dot{\theta})\hat{\alpha}_j \quad (13)$$

Hence, the signal E(t) may be expressed as follows:

$$\varepsilon_j(t) = H(q^{-1})\frac{Corr_j(q^{-1})L_j(q^{-1})}{1 + Corr_j(q^{-1})L_j(q^{-1})} \cdot (\alpha_j^T(t) - \hat{\alpha}_j^T(t))\phi_j(t) \quad (14)$$

The previous relation (14) leads to propose the following estimation formula:

$$\hat{\alpha}_j(t+1) = \hat{\alpha}_j(t) + \mu_j\phi_j^T(t)\varepsilon_j(t) \quad (15)$$

where $\mu_1$ is a positive real defined square matrix, which serves as a parameter for adjusting the speed of convergence of the estimation. This formula results from the application of the recursive gradient algorithm.

According to the passivity theory, a sufficient condition of convergence of the convergence formula (15) is given by the following condition:

$$\mathcal{R}e\left(H(z)\frac{C(z)L(z)}{1+C(z)L(z)}\right)>0\,\forall\,z \quad (16)$$

This condition of convergence may sometimes prove restricting, so it is preferable to free from it by a suitable filtering of $\phi_j(t)$. This filtering consists in filtering the components of the matrix $\phi_j^T(t)$ by $H_j Corr_j G_j/(1+C_j H_j)$ to obtain the matrix $\phi_{Fj}(t)$.

Let's define $T(q^{-1})$ such that:

$$(1+Corr(q^{-1})L(q^{-1}))\cdot T(q^{-1})=Corr(q^{-1})L(q^{-1}) \quad (17)$$

The following compensation law is finally proposed:

$$\hat{\alpha}_j(t+1)=\hat{\alpha}_j(t)+\mu_j\phi_{Fj}^T(t)\varepsilon_j(t) \quad (18)$$

with $\phi_{Fj}(t)=H(q^{-1})T(q^{-1})\phi_j(t)$ (19)

If the vector $\phi_{Fj}(t)$ is decorrelated from the noise of the loop j, then the estimation of the vector $\hat{\alpha}_j$ is not biased.

FIG. 7 shows the whole control law implementing this compensation law with in-line estimation of the $\hat{\alpha}_j$ and that corresponds to the second mode of in-line estimation that allows calculating the parameters useful for the compensation.

In this second embodiment, the control law of FIG. 7 may be used as such to obtain the compensation during the use of the movement simulator to perform tests on measurement devices.

However, the compensation is efficient/obtained only for constant-speed movements and when one or several movement speeds are modified in the simulator, transients are liable to occur, which are detrimental to the compensation, but also to the quality of the estimation.

Consequently, it is preferred that the first embodiment shown in FIG. 8 for the compensation during tests on movement simulator, corresponding to a phase of functional use of the movement simulator and that uses the results of the control law of FIG. 7, the results (base parameters) being stored for a later use with the control law corresponding to FIG. 8.

To be able to fully use this first mode of FIG. 8, the following action that passes through the second mode is used:
- for each non-linear effect of each axis, a constant-speed sensitizing movement leading to a significant disturbance on one or several other axes is chosen. This process is hence repeated to process all the axes.
- the adaptive law of the second mode, i.e. according to the control law of FIG. 7, is applied until there is convergence, i.e. the signal $\varepsilon(t)$ tends to 0 and hence the base parameters become constant at the desired accuracy.
- after convergence, the estimated base parameters $\hat{\alpha}(t)$ become/are constant and are memorized in tables. The tables are hence consisted of estimated base parameters $\hat{\alpha}$, with a table for each axis, wherein the number of parameters to be stored does not exceed about ten for each axis.
- once the tables obtained, the control law of the first compensation mode as shown in FIG. 8 may be used, that is to say that the values of a memorized in the table are reused according to a law of the type:

$$\hat{P}_j(t)=\phi_j^T(\theta,\dot{\theta})\hat{\alpha}_j$$

It hence becomes possible, in the first mode, to use the compensation on other movements than constant-speed movements.

The invention has been applied to a movement simulator of the IXBLUE Company, herein a machine Evo-30, with three controlled-axes, and it has been possible to obtain attenuations of the coupling disturbances of 17 dB and 22 dB according to the axes and the type of disturbance Coriolis, centrifugal and/or gravitational.

The invention claimed is:

1. A method for compensating for disturbing torques for a movement simulator, said simulator including joints controlled by effector members about axes j as a function of movement set points $\theta^r_j$ on the axes, each effector member of a specific given axis of the effector member receiving a command $U_j$ and a sensor for the axis measuring $\theta_j$, the action of the effector member about said axis j, the simulator being in a system including, for each axis, a control law with a monovariable corrector block in a feedback loop, said monovariable corrector block of transfer function $Corr(q^{-1})$ receiving as an input a signal of difference between the set point $\theta^r_j$ and the measurement $\theta_j$ for the corresponding axis and producing as an output the command $U_j$,
wherein the disturbing torques are Coriolis, centrifugal and gravitational torques and wherein, for each axis, a control law is implemented, which includes, in addition to the monovariable corrector block per axis, a non-linear and multivariable compensation law combined to the monovariable correctors, the compensation law calculating, as a function of the command $U_j$, an estimation $\hat{P}_j(t)$ of the disturbing torques, said estimation $\hat{P}_j(t)$ being injected into the command $U_j$ sent to the effector member, to compensate for the disturbing torques, and
wherein the estimation $\hat{P}_j(t)$ of the disturbing torques being calculated based on the value of an error signal $\varepsilon_j(t)$, which is a version of the command $U_j$ filtered by a transmittance filter $H(q^{-1})$ intended to eliminate at least the direct component from the command, and the movement simulator is previously modelled in order to obtain a dynamic model affinely expressing the torques with respect to a set of base parameters % according to a matrix relation of the type: $\phi_j^T(\theta,\dot{\theta},\ddot{\theta})\chi$, the index j corresponding to the different axes, a sub-set $\alpha_j$ of the base parameters corresponding to disturbing torques having a level higher than a determined disturbance threshold is determined, following to the previous modelling of the simulator, the estimation $\hat{P}_j(t)$ of the disturbing torques being calculated by: $\hat{P}_j(t)=\phi_j^T(\theta,\dot{\theta})\hat{\alpha}_j$, and
wherein the estimations of the sub-sets of base parameters are calculated in line by an iterative equation:

$$\hat{\alpha}_j(t+1)=\hat{\alpha}_j(t)+\mu_j\phi_{Fj}^T(t)\varepsilon_j(t)$$

with $\phi_{Fj}(t)=H(q^{-1})T(q^{-1})\phi_1(t)$
the vector elements $\phi_j^T(t)$ being filtered by $H_j Corr_j G_j/(1+C_j H_j)$ to obtain the vector $\phi_{Fj}^T(t)$,
T being defined by the relation $(1+Corr(q^{-1})L(q^{-1}))\cdot T(q^{-1})=Corr(q^{-1})L(q^{-1})$, with $L_j(q^{-1})$ the discrete transmittance of the transform of the product $$\frac{1}{J_j}\frac{1}{S}$$

in the case of a sampled system where $J_j$ are the inertias and $\mu_j$ is a defined positive real square matrix serving as an adjustment parameter for the speed of convergence of the estimation.

2. The method according to claim 1, wherein, during the calculation of the estimation $\hat{P}_j(t)$ of the disturbing torques, the effects of the variation of the inertia matrix are neglected.

3. The method according to claim 2, wherein a real-time adaptive compensation is implemented, in which the estimations of the sub-set of base parameters are previously calculated and stored in tables, wherein:
in a preliminary phase:
for each non-linear effect of each axis, a sensitizing movement is chosen on one or several other constant-speed axes, leading to a significant disturbance in the torque of said axis,
estimations of the sub-set of base parameters are calculated by the iterative equation $\hat{\alpha}_j(t+1)=\hat{\alpha}_j(t)+\mu_j\phi_{Fj}^T(t)\varepsilon_j(t)$ until there is convergence,
in a real-time implementation phase, the base parameter tables are directly used to calculate the estimation $\hat{P}_j(t)$ of the disturbing torques by: $\hat{P}_j(t)=\phi_j^T(\theta,\dot{\theta})\hat{\alpha}_j$.

4. The method according to claim 2, wherein a recursive gradient algorithm is implemented.

5. The method according to claim 2, wherein the movement simulator is used at constant speed or low speed-variation rate in the phase of estimation of the estimates $\hat{\alpha}_j(t)$.

6. The method according to claim 1, wherein the transmittance filter $H(q^{-1})$ intended to eliminate the direct component from the command is a high-pass filter.

7. The method according to claim 6, wherein a real-time adaptive compensation is implemented, in which the estimations of the sub-set of base parameters are previously calculated and stored in tables, wherein:
in a preliminary phase:
for each non-linear effect of each axis, a sensitizing movement is chosen on one or several other constant-speed axes, leading to a significant disturbance in the torque of said axis,
estimations of the sub-set of base parameters are calculated by the iterative equation $\hat{\alpha}_j(t+1)=\hat{\alpha}_j(t)+\mu_j\phi_{Fj}^T(t)\varepsilon_j(t)$ until there is convergence,
in a real-time implementation phase, the base parameter tables are directly used to calculate the estimation $\hat{P}_j(t)$ of the disturbing torques by: $\hat{P}_j(t)=\phi_j^T(\theta,\dot{\theta})\hat{\alpha}_j$.

8. The method according to claim 6, wherein a recursive gradient algorithm is implemented.

9. The method according to claim 6, wherein the movement simulator is used at constant speed or low speed-variation rate in the phase of estimation of the estimates $\hat{\alpha}_j(t)$.

10. The method according to claim 1, wherein a real-time adaptive compensation is implemented, in which the estimations of the sub-set of base parameters are previously calculated and stored in tables, wherein:
in a preliminary phase:
for each non-linear effect of each axis, a sensitizing movement is chosen on one or several other constant-speed axes, leading to a significant disturbance in the torque of said axis,
estimations of the sub-set of base parameters are calculated by the iterative equation $\hat{\alpha}_j(t+1)=\hat{\alpha}_j(t)+\mu_j\phi_{Fj}^T(t)\varepsilon_j(t)$ until there is convergence,
in a real-time implementation phase, the base parameter tables are directly used to calculate the estimation $\hat{P}_j(t)$ of the disturbing torques by: $\hat{P}_j(t)=\phi_j^T(\theta,\dot{\theta})\hat{\alpha}_j$.

11. The method according to claim 10, wherein the convergence corresponds to the fact that the value of the error signal $\varepsilon_j(t)$ tends to zero.

12. The method according to claim 11, wherein a recursive gradient algorithm is implemented.

13. The method according to claim 11, wherein the movement simulator is used at constant speed or low speed-variation rate in the phase of estimation of the estimates $\hat{\alpha}_j(t)$.

14. The method according to claim 10, wherein a recursive gradient algorithm is implemented.

15. The method according to claim 10, wherein the movement simulator is used at constant speed or low speed-variation rate in the phase of estimation of the estimates $\hat{\alpha}_j(t)$.

16. The method according to claim 1, wherein a recursive gradient algorithm is implemented.

17. The method according to claim 1, wherein the movement simulator is used at constant speed or low speed-variation rate in the phase of estimation of the estimates $\hat{\alpha}_j(t)$.

18. The method according to claim 1, wherein a movement simulator is implemented, which has at least two controlled axes and which includes for each axis a control law with a monovariable corrector block in a feedback loop, said corrector receiving as an input a signal of difference between the setpoint $\theta^r_j$ and the measurement $\theta_j$ for the corresponding axis and producing as an output the command $U_j$ intended to an effector member, and wherein, between the output of the corrector block and the effector member, a hardware module is added, for calculating the compensation law and compensating the command, said module being either a computer program loaded on a support and intended to complete an computer program of the monovariable corrector block, or an electronic and programmable device for capturing the command at the exit of the corrector block and sending to the motor a command compensated by the compensation law.

19. The method according to claim 1, wherein a joint model is used, in which the inertias of the different joints are independent relative to each other, the inertia tensors of the joints of the movement simulator being a diagonal matrix.

20. A system with a movement simulator including a movement simulator and means for compensating for disturbing torques, said simulator including joints controlled by effector members about axes j as a function of movement set points $\theta^r_j$ on the axes, each effector member of a specific given axis of the effector member receiving a command $U_j$ and a sensor for the axis measuring $\theta_j$, the action of the effector member about said axis j, the system including, for each axis, a control law with a monovariable corrector block in a feedback loop, said corrector block receiving as an input a signal of difference between the set point $\theta^r_j$ and the measurement $\theta_j$ for the corresponding axis and producing as an output the command $U_j$, wherein the means for compensating for the disturbing torques are a programmable calculator specifically configured to execute the method according to claim 1.

* * * * *